(12) United States Patent
Konanur et al.

(10) Patent No.: US 8,772,976 B2
(45) Date of Patent: Jul. 8, 2014

(54) RECONFIGURABLE COIL TECHNIQUES

(75) Inventors: Anand S. Konanur, San Jose, CA (US);
Ulun Karacaoglu, San Diego, CA (US);
Songnan Yang, San Jose, CA (US);
Emily B. Cooper, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 382 days.

(21) Appl. No.: 13/075,357

(22) Filed: Mar. 30, 2011

(65) Prior Publication Data

US 2012/0248883 A1 Oct. 4, 2012

(51) Int. Cl.
*H02J 17/00* (2006.01)
*H01F 21/12* (2006.01)
*H03H 5/12* (2006.01)
*H02P 13/06* (2006.01)

(52) U.S. Cl.
USPC ........... 307/104; 307/112; 307/116; 307/125; 307/313

(58) Field of Classification Search
USPC .......................... 307/104, 112, 116, 125, 313
See application file for complete search history.

(56) References Cited

U.S. PATENT DOCUMENTS

| 2010/0114143 | A1* | 5/2010 | Albrecht et al. | 606/191 |
|---|---|---|---|---|
| 2010/0244577 | A1* | 9/2010 | Shimokawa | 307/104 |
| 2011/0025133 | A1* | 2/2011 | Sauerlaender et al. | 307/104 |
| 2011/0025465 | A1* | 2/2011 | Danekilde | 340/10.1 |
| 2011/0062793 | A1* | 3/2011 | Azancot et al. | 307/116 |

FOREIGN PATENT DOCUMENTS

| JP | 2003-318632 A | 11/2003 |
|---|---|---|
| JP | 2010-098893 A | 4/2010 |
| WO | 2009/122355 A2 | 10/2009 |
| WO | 2012/135211 A2 | 10/2012 |
| WO | 2012/135211 A3 | 10/2012 |

OTHER PUBLICATIONS

International Search Report and Written opinion received for PCT Patent Application No. PCT/US2012/030731, mailed on Sep. 17, 2012, 9 pages.
International Preliminary Report on Patentability and Written Opinion received for PCT Patent Application No. PCT/US2012/030731 mailed on Oct. 10, 2013, 6 pages.

\* cited by examiner

*Primary Examiner* — Jared Fureman
*Assistant Examiner* — Daniel Kessie
(74) *Attorney, Agent, or Firm* — Sutherland Asbill & Brennan LLP

(57) ABSTRACT

Techniques are disclosed involving reconfigurable coils. Such coils may be used in applications, including (but not limited to) wireless charging and near field communications (NFC). For instance, a reconfigurable coil may include a first conductive portion and a second conductive portion. Two or more configurations may be established. These configurations may correspond to particular current paths. For example, in a circular configuration, a path is provided having the same rotational sense in both first and second conductive portions. However, in a figure eight configuration, a path is provided having a first rotational sense in the first conductive portion and a second rotational sense in the second conductive portion. A switch coupled between these portions may set the coil's configuration. Configurations may be selected based on one or more operating conditions involving the coil.

20 Claims, 13 Drawing Sheets

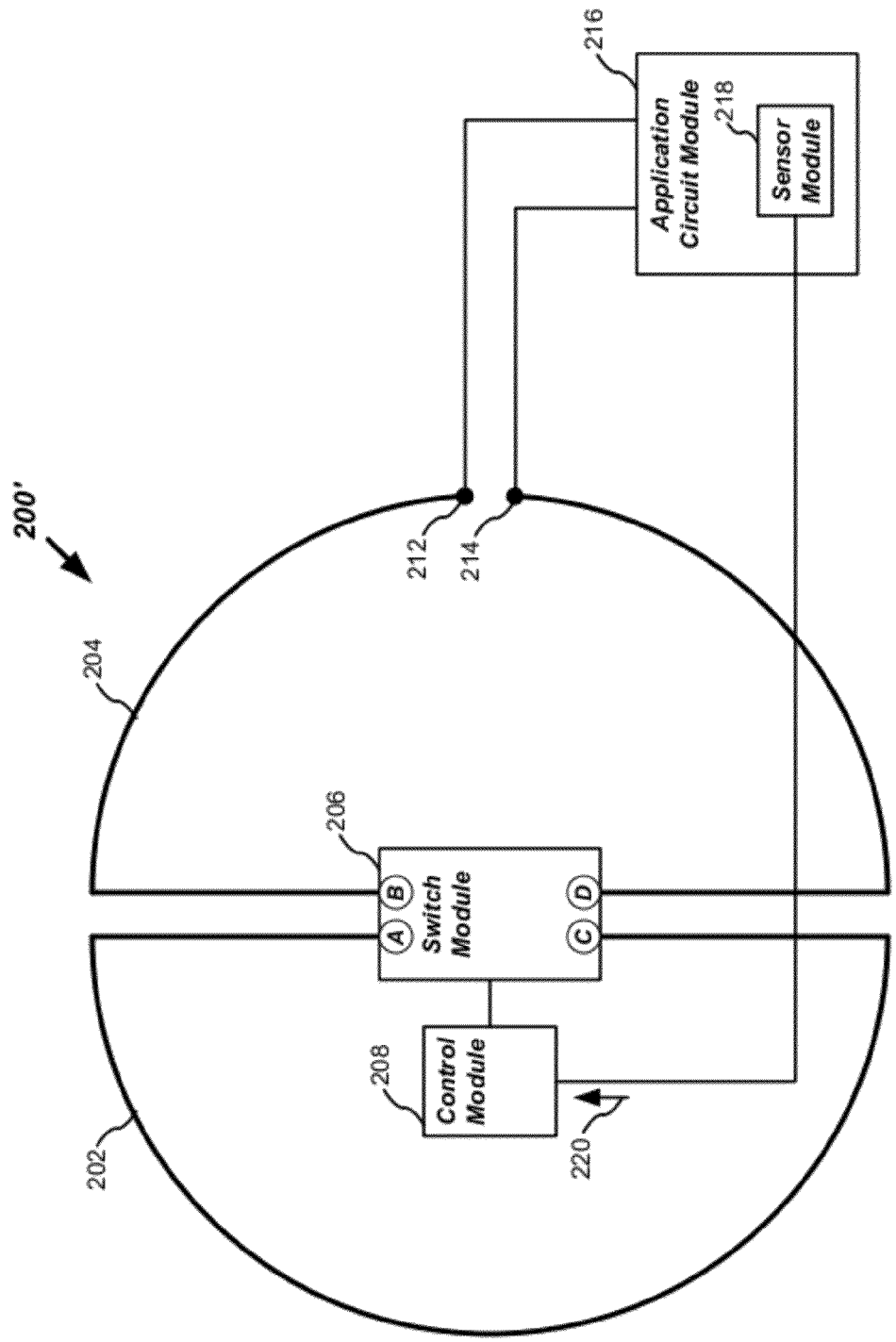

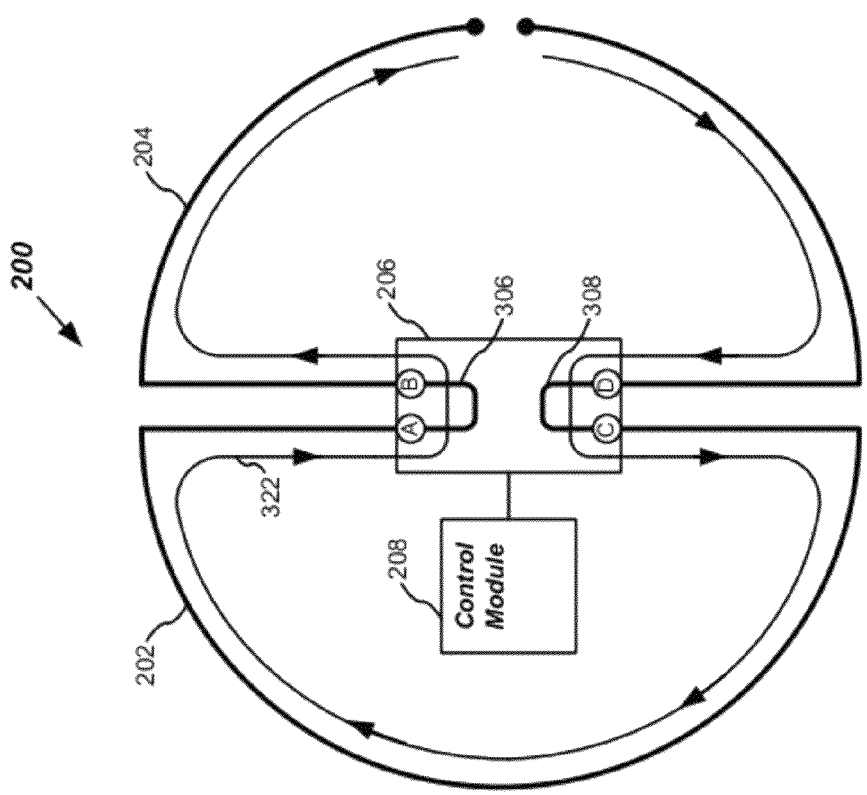
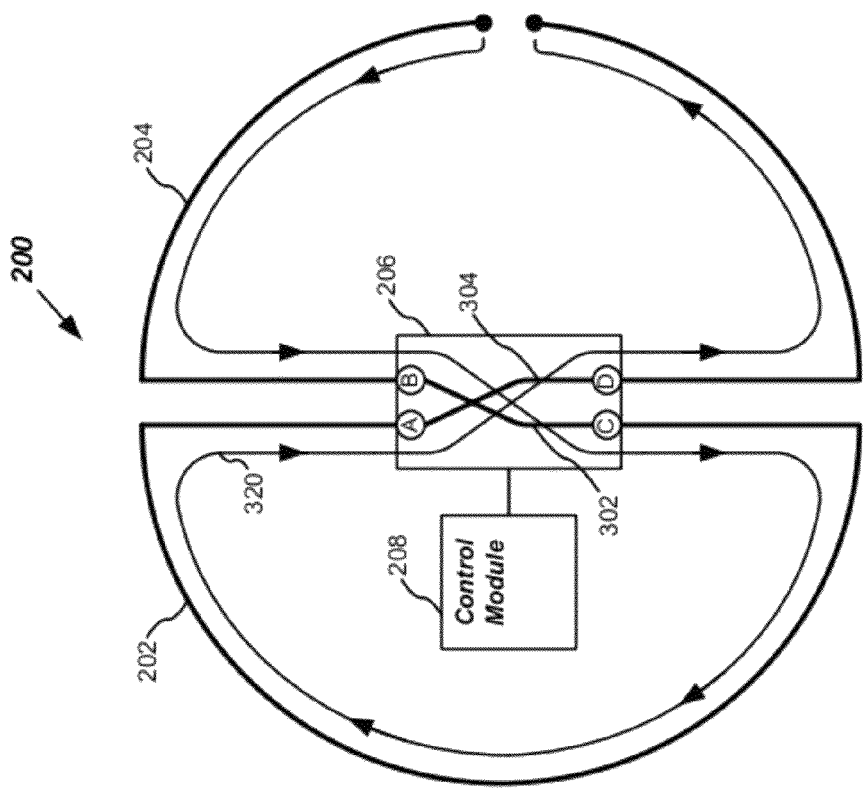
FIG. 3A
FIG. 3B

RECONFIGURABLE COIL TECHNIQUES

BACKGROUND

Devices within close proximity may wirelessly transfer energy for various reasons. For instance, a device may wirelessly charge another device's battery. Also, two devices may engage in near field communications (NFC).

Such wireless energy transfer may involve an electromagnetic coupling between proximate coils. For example, a first device may have a transmitting coil and a second device may have a receiving coil. When an electrical current flows through the transmitting coil, a magnetic field is generated. In turn, this magnetic field may induce an electrical current in the receiving coil.

The effectiveness of such energy transfer may be based on the alignment between coils For instance, when a misalignment exists between transmitting and receiving coils, a smaller electrical current is induced in the receiving coil. As a result, a reduced energy transfer occurs. This may unfortunately reduce the efficacy of wireless charging and NFC applications.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein:

FIGS. 2A and 2B are diagrams of exemplary coil arrangements;

FIGS. 3A and 3B are diagrams of coil apparatus configurations;

DETAILED DESCRIPTION

Figure 1:
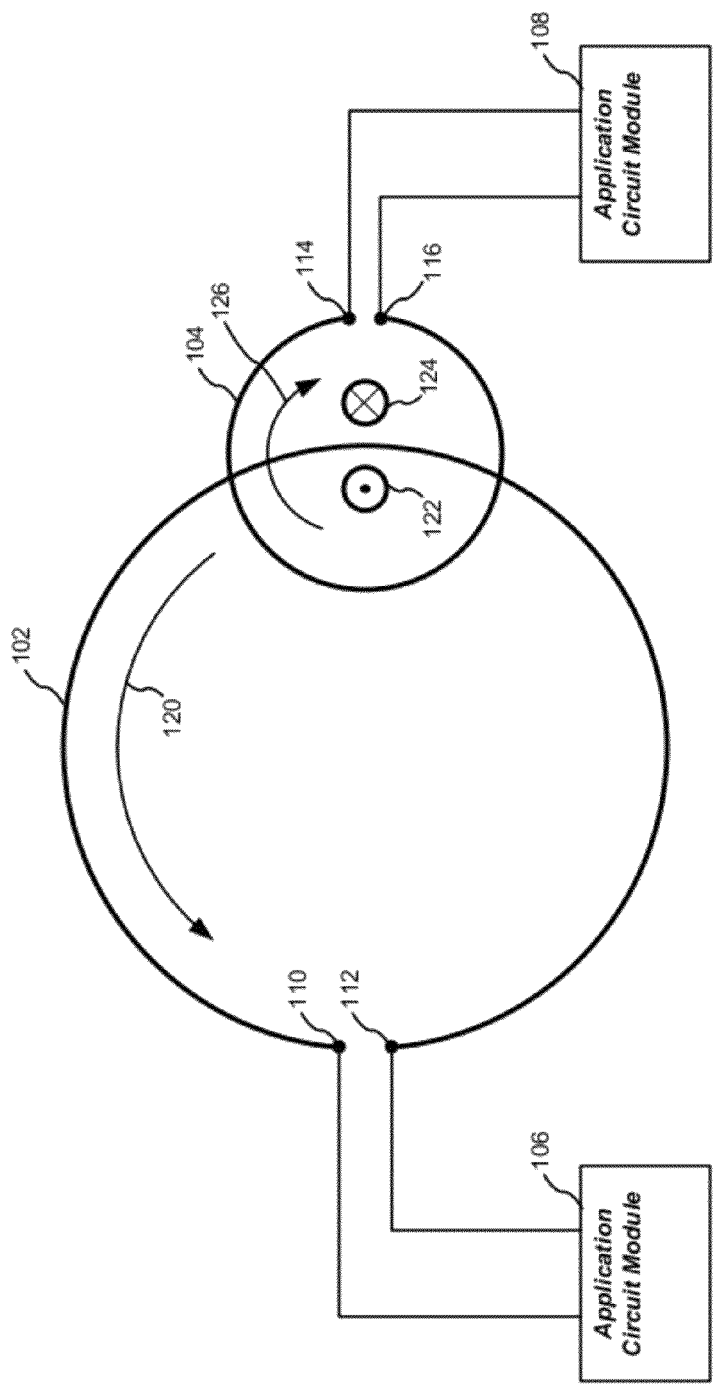
FIG. 1 is a diagram of a conventional arrangement of transmitting and receiving coils.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments provide techniques involving reconfigurable coils. Such coils may be used in applications, including (but not limited to) NFC and wireless charging applications. Exemplary wireless charging applications include (but are not limited to) any versions or conventions of Wireless Resonant Energy Link (WREL) (WREL is developed by Intel Corporation of Santa Clara, Ca.), and wireless power techniques, as provided by the Consumer Electronics Association (CEA). However, embodiments may be employed with other wireless charging techniques, standards, and contexts.

For instance, a reconfigurable coil may include a first electrically conductive portion and a second electrically conductive portion. Two or more configurations may be established. In embodiments, these configurations may correspond to particular current paths. For example, in a circular configuration, a path is provided having the same rotational sense in both the first and the second conductive portions. However, in a figure eight configuration, a path is provided having a first rotational sense in the first conductive portion and a second rotational sense in the second conductive portion. A switch (e.g., a double pole, double throw switch) coupled between these portions may set the coil's configuration.

The coil's configuration may be selected based on various operating conditions. For instance, the coil's configuration may be selected based on its alignment (or misalignment) with another coil. This alignment (or misalignment) may be considered as an offset between the two coils' axes. However, other representations of alignment or misalignment (e.g., offsets based on central or centroidal points) may be employed. Alternatively or additionally, the coil's configuration may be selected based on energy transfer characteristics.

As an example of alignment-based configuration, the circular configuration may be employed when the coil axes are in close alignment (i.e., when a small offset exists). Also, the circular configuration may be employed when the axes are misaligned to a large extent (i.e., when a large offset exists) such that there is no overlapping area when one coil is projected onto the other. Otherwise, the figure eight configuration may be employed. Embodiments, however, are not limited to this exemplary employment of configurations.

This alignment may be determined by various techniques. One technique involves using a Hall Effect sensor that senses a magnetic field strength at a location within or near a reconfigurable coil (e.g., a reconfigurable receiving coil). This magnetic field strength indicates axial alignment (or misalignment) of the transmitting and receiving coils. Based on the sensed magnetic field strength, the coil's configuration may be established. In embodiments, this may involve selecting the configuration based on a comparison of the sensed magnetic field strength with one or more thresholds. Embodiments, however, are not limited to this example.

Additionally or alternatively, the axial alignment may be indicated through the employment of a proximity sensor that senses the relative position of a reconfigurable coil (either a transmitting coil or a receiving coil) with respect to another coil. This relative position indicates alignment with the other coil. Based on this sensed position, a configuration may be established. For instance, the figure eight configuration may be established for a certain range of misalignment. However, outside of this range (e.g., when the misalignment is either high or low), the circular configuration may be established.

As described above, the coil's configuration may be based on energy transfer characteristics. For instance, a configuration may be selected based on power received through a receiving coil, reflected power at a transmitting coil, and/or forward power at a transmitting coil.

Such features may help provide for wireless charging at relatively greater degrees of misalignment between two devices, such as a notebook computing platform and a device to be charged (e.g., a portable phone, a tablet computer, etc.). Also, such wireless charging may occur at greater distances when misalignments occur.

In addition, NFC communications may occur at relatively greater degrees of misalignment between two devices. Further, an increase may be achieved in the read range of an NFC device (e.g., a notebook computing platform, etc.) paired with another NFC-enabled device (e.g., a portable phone, a tablet computer, etc.).

FIG. 1 is a diagram of a conventional arrangement 100 having a transmitting coil 102 and a receiving coil 104. This arrangement may be employed in various applications, such as near field communication (NFC) and wireless charging.

As shown in FIG. 1, transmitting coil 102 includes terminals 110 and 112. These terminals are connected to an application circuit module 106. Similarly, receiving coil 104 includes terminals 114 and 116. These terminals are connected to an application circuit module 108. Application circuit module 106 generates a signal (e.g., an electrical current) associated with a wireless application, such as wireless charging or NFC. Conversely, application circuit module 108 receives and processes a corresponding signal associated with the application.

For instance, application circuit module 106 generates an electrical current 120 that flows through transmitting coil 102. This results in the generation of a magnetic field. Through this magnetic field, transmitting coil 102 creates a flux linkage with receiving coil 104. As a result, an inductive coupling is achieved. Consequently, a current 126 is induced in receiving coil 104. In turn, current 126 is received by application circuit module 108.

FIG. 1 shows flux vectors 122 and 124 that are associated with the magnetic field generated by transmitting coil 102. More particularly, FIG. 1 shows that flux vectors 122 and 124 have contrary directions (i.e., flux vector 122 is leaving the page and flux vector 124 is entering the page).

The extent of this linkage (and consequently the magnitude of current 126) may be based on various factors. One such factor is the alignment of coils 102 and 104 with respect to a common axis.

For instance, there are a set of misalignments where large dips in the coupling between coils 102 and 104 occurs. Such dips may be due to the flux vectors in one portion of receiving coil 104 having an opposing direction to the flux vectors in a second portion of receiving coil 104. Thus, offsetting linkage components occur with receiving coil 104. This results in a net flux linkage that may be very low.

For purposes of illustration, FIG. 1 shows that transmitting coil 102 and receiving coil 104 are not aligned at their axes (or their centers). More particularly, FIG. 1 shows that these coils are misaligned to an extent such that a portion of receiving coil 104 is aligned to the outside of transmitting coil 102. As a result, flux vectors 122 and 124 induce opposing electrical current components within receiving coil 104. This may reduce the magnitude of the overall current (e.g., current 126) in receiving coil 104.

Such reductions may compromise performance. For instance, wireless charging applications may suffer from reduced energy transfer. Also, NFC applications may suffer from lower received signal strengths and increased error rates.

Figure 2A:
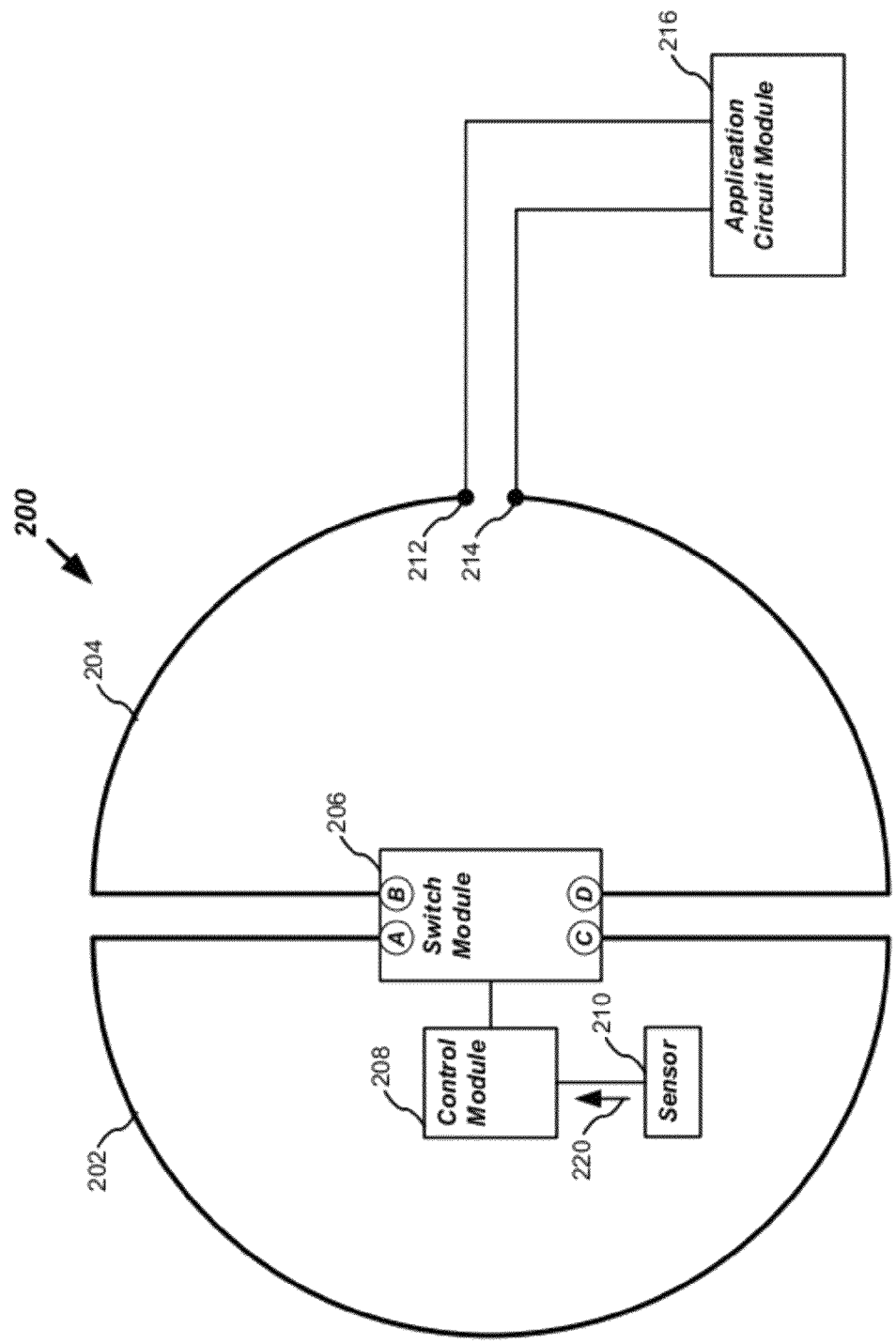

FIG. 2A is a diagram of an exemplary coil apparatus 200 that is reconfigurable. In embodiments, coil apparatus 200 may be employed as either a receiving coil or a transmitting coil, for example, in wireless charging and/or NFC applications. Embodiments, however, are not limited to such examples.

As shown in FIG. 2A, coil apparatus 200 includes a first electrically conductive portion 202, a second electrically conductive portion 204, a switch module 206, a control module 208, and a sensor 210. Also, coil apparatus 200 includes terminals 212 and 214.

Each of portions 202 and 204 is composed of a conductive material that allows electrical currents to flow. Together, portions 202 and 204 (coupled by switch module 206) form a coil. Although portions 202 and 204 are shown having semicircular shapes, embodiments are not limited to this shape. Moreover, FIG. 2A shows portions 202 and 204 being substantially the same in size. However, in embodiments, such portions may be of different sizes.

Portions 202 and 204 are connected to switch module 206. FIG. 2A shows that switch module 206 includes connection terminals A, B, C, and D. These terminals provide connections to portions 202 and 204. In particular, portion 202 is connected to switch module 206 by terminals A and C, while portion 204 is connected to switch module 206 by terminals B and D.

In embodiments, switch module 202 may establish configurations for coil apparatus 200. These configurations determine the manner in which currents may flow through portions 202 and 204. Examples of such configurations are described below with reference to FIGS. 3A and 3B.

Coil apparatus 200 may include one or more sensors. As an example, FIG. 2A shows sensor 210. Sensor 210 generates a sensor output signal 220 which indicates an alignment (or misalignment) with another coil. In embodiments, sensor output signal 220 may be an analog signal. Alternatively, sensor output signal 220 may be a digital signal.

In embodiments, sensor 210 may be a Hall Effect sensor (e.g., when coil apparatus 200 operates as a receiving coil). The Hall Effect sensor senses a magnetic field strength and direction at a location. This location may be within or near the coil formed by portions 202 and 204. Thus, sensor output signal 220 (through its magnitude and sign) may indicate the strength and direction of a sensed magnetic field.

Alternatively, sensor 210 may be a proximity sensor that senses the relative position of coil apparatus 200 with respect to another coil. This relative position indicates axial alignment (or misalignment) of the coils. Such a proximity sensor may emit a field or radiation. Characteristics (e.g., magnitudes or changes) in the field or radiation (or in a return signal) indicate the relative position. Sensor output signal 220 may be based on such characteristics. Thus, sensor output signal 220 may indicate a proximity (e.g., through its magnitude). In embodiments, the other coil may operate as a target object for the proximity sensor. Alternatively or additionally, a separate target object may be positioned within or near the other coil.

Based on sensor output signal 220 (which indicates alignment), control module 208 may direct switch module 206 to employ a particular configuration. In embodiments, control module 208 may determine this configuration by comparing sensor output signal 220 with one or more thresholds.

FIG. 2A further shows that terminals 212 and 214 of coil apparatus 200 are coupled to an application circuit module 216. Application circuit module 216 produces or receives electrical currents that circulate in coil apparatus 200. These electrical currents may be associated with applications (e.g., wireless charging and/or NFC applications).

For example, when coil apparatus 200 operates as a transmitting coil, application circuit module 216 generates a current that is circulated through coil apparatus 200. This current generates a flux that is intended to induce a corresponding electrical current in a remote receiving coil. Thus, application circuitry module 216 may include components, such as signal generation circuitry, and/or data transmission circuitry (e.g., modulators, amplifiers, etc). Embodiments, however, are not limited to these examples.

Alternatively, when coil apparatus 200 operates as a receiving coil, application circuit module 216 receives a current from coil apparatus 200 that is based on a coupling with a remote transmitting coil. In turn, application circuit module 216 processes this current. Thus, application circuit module 216 may include components, such as battery charging circuitry, and/or data signal reception circuitry. Embodiments, however, are not limited to these examples.

As described herein, coil apparatus 200 includes a sensor 210. In embodiments, such a sensor may be (alternatively or additionally) included in application circuit module. FIG. 2B shows an example of such an implementation.

More particularly, FIG. 2B shows a coil apparatus 200' and an application circuit module 216'. These elements are similar to those of FIG. 2A. However, in FIG. 2B, application circuit module 216' includes a sensor module 218. Further, as shown in FIG. 2B, control module 208 receives sensor output signal 220 from sensor module 218 within application circuit module 216'. Sensor module 218 may detect various characteristics involving the transfer of energy or power between coils.

For instance, when coil apparatus 200' operates as a transmitting coil, sensor module 218 may measure reflected power. To make such measurements, sensor module 218 may include a directional coupler that receives reflected energy, but not forward transmitted energy. Also, sensor module 218 may measure forward power. Further, sensor module 218 may compare forward and reflected power (such a comparison may achieve greater precision). High reflected power indicates misalignment of the coils and/or an improper coil configuration. Sensor module 218 may provide indications of reflected power, forward power, and/or the comparison of forward and reflected power to control module 208 as sensor output signal 220. As described herein, a configuration of coil apparatus 200 may be established based on sensor output signal 220.

Alternatively, when coil apparatus 200 operates as a receiving coil, sensor module 218 may measure power received from the transmitting coil (which is based on the induced current in coil apparatus 200). Thus, sensor module 218 may include circuitry to measure received power. A large received power measurement may indicate alignment and/or a proper coil configuration, while a low power measurement may indicate misalignment and/or an improprer coil configuration. In turn, this measured power may be indicated to control module 208 in sensor output signal 220. As described herein, a configuration of coil apparatus 200 may be established based on sensor output signal 220.

In further embodiments, sensor module 218 may receive information from a remote device. For example, sensor module 218 may receive information that is originated from a remote device having a coil with which coil apparatus 200' is exchanging energy. This other coil (referred to herein as a remote coil) may have a corresponding application circuit module that is measuring operational characteristics.

For example, when the remote coil is a transmitting coil, its application circuit module may measure reflected and/or forward power, and may communicate such measurements to sensor module 218. Alternatively, when the remote coil is a receiving coil, it may measure received power and may communicate such measurements to sensor module 218. Such data communications may occur over various communications media that exist between the corresponding devices. Further details regarding such techniques are described below with reference to FIG. 11.

FIGS. 3A and 3B provide examples of different configurations for coil apparatuses 200 and 200'. In embodiments, these configurations are established by switch module 206, as controlled by control module 208.

FIG. 3A shows coil apparatus 200 in a figure eight configuration. In this configuration, switch module 206 provides couplings or connections between terminals A and D, and between terminals B and C. Through this configuration, electrical current may flow along a current path 320. FIG. 3A shows that the rotational sense of current path 320 is different in portions 202 and 204. More particularly, current path 320 has a clockwise sense in portion 202, and a counter-clockwise sense in portion 204.

FIG. 3B shows coil apparatus 200 in a circular configuration. In this configuration, switch module 206 provides couplings or connections between terminals A and B, and between terminals C and D. Through this configuration, electrical current may flow along a current path 322. FIG. 3B shows that the rotational sense of current path 322 is the same (clockwise) in both portions 202 and 204.

Figure 4A:
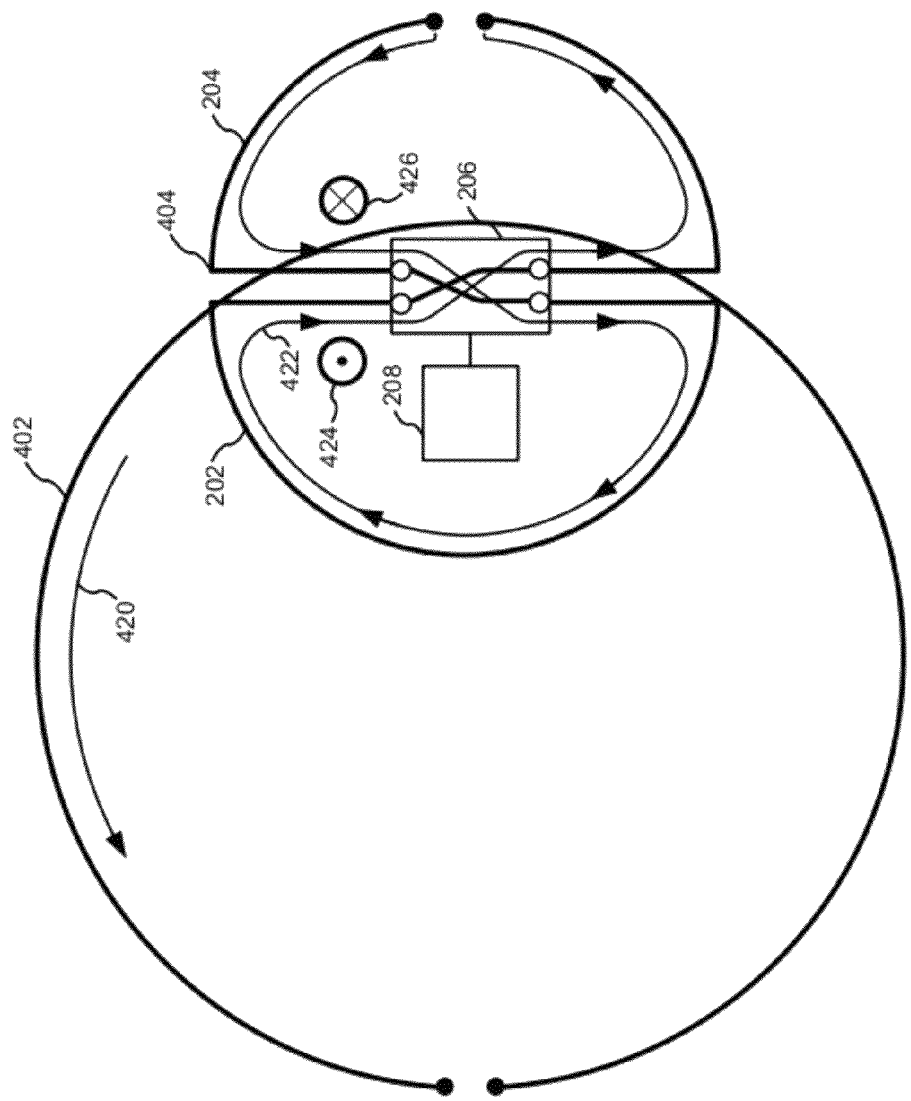
FIGS. 4A, 4B, and 4C are diagrams showing configurations for different alignments.
Figure 4B:
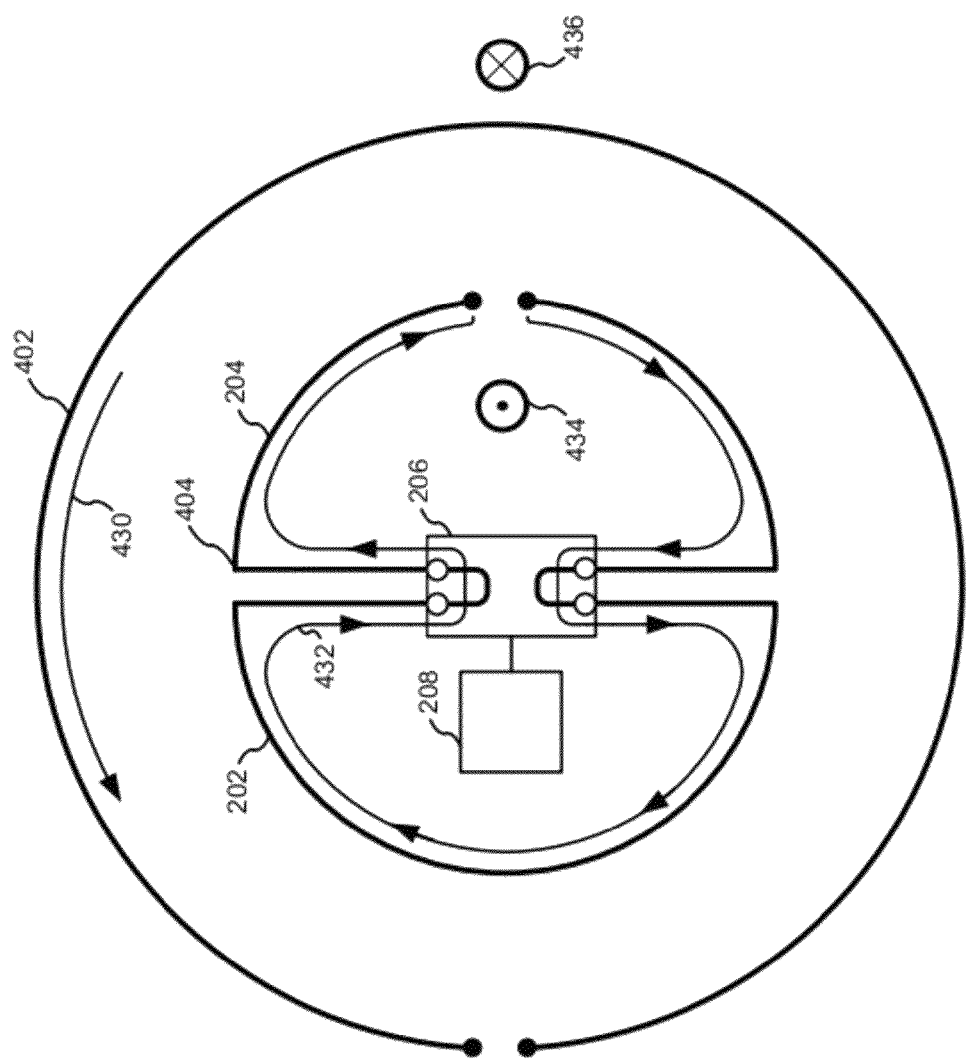
Figure 4C:
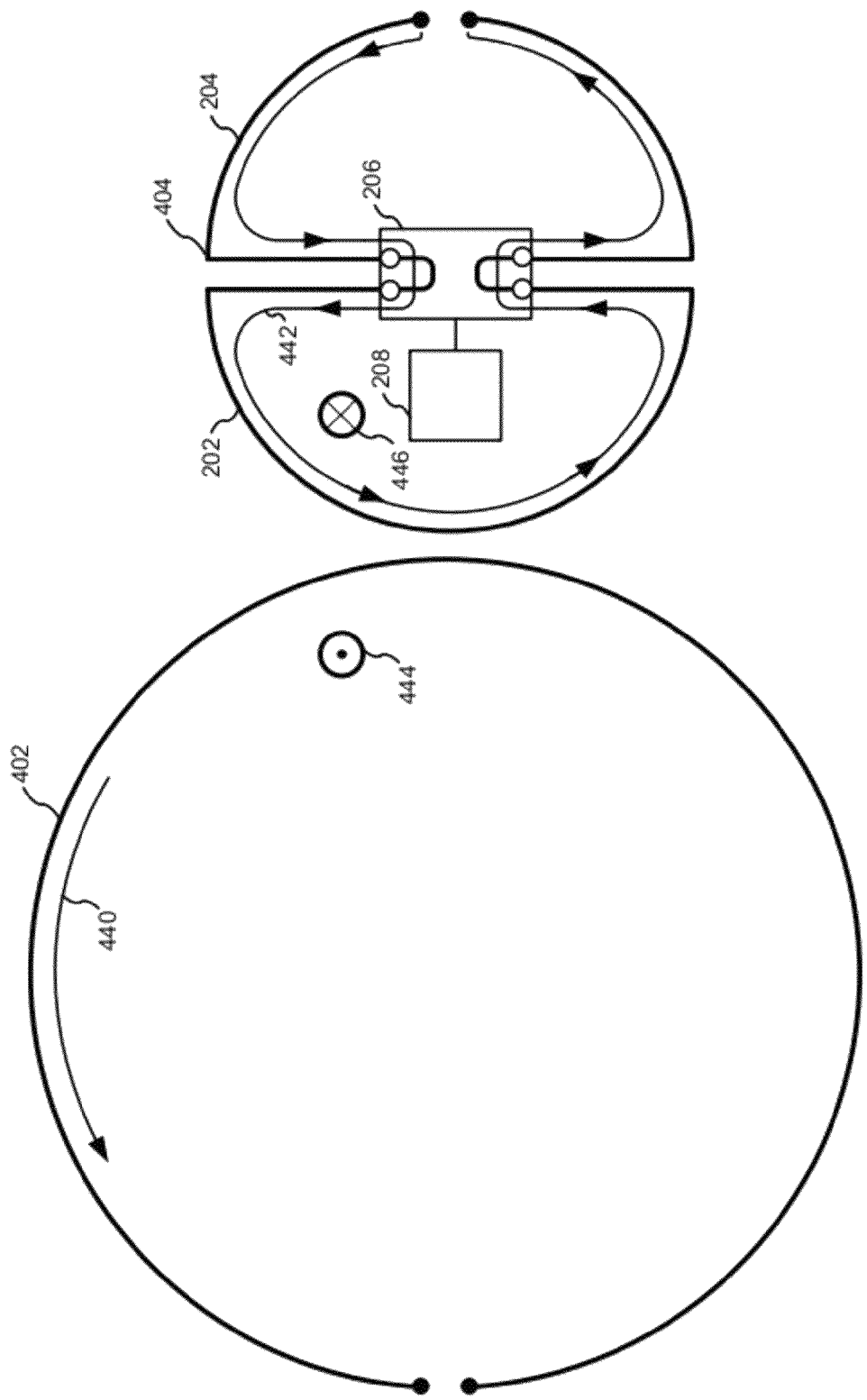

FIGS. 4A-4C show an exemplary employment of such configurations for a receiving coil. In particular, FIGS. 4A-4C show a transmitting coil 402 and a receiving coil apparatus 404 in different alignments. Receiving coil apparatus 404 may be implemented as described above with reference to FIGS. 2A, 2B, 3A, and 3B (e.g., as coil apparatus 200 or 200'). Embodiments, however, are not limited to this implementation.

In FIG. 4A, the axes of transmitting coil 402 and receiving coil apparatus 404 are not aligned. More particularly, the axes are misaligned to the extent that, when transmitting coil 402 is projected onto receiving coil apparatus 404, they do not completely overlap. For instance, receiving coil apparatus 404 has a non-overlapping area that mainly corresponds to portion 204.

A current 420 flows in transmitting coil 402. This current causes magnetic flux vectors 424 and 426. FIG. 4A shows vector 424 coming out of the page and vector 426 entering the paper. These vectors induce component currents in receiving coil apparatus 404 that have opposite rotational sense. For instance, flux vector 424 induces a clockwise component current (e.g., in portion 202), while flux vector 426 induces a counter-clockwise component current (e.g., in portion 204).

To increase the net current resulting from such component currents, FIG. 4A shows that receiving coil apparatus 404 employs a figure eight configuration in this alignment. This configuration allows a net current 422 to flow in a clockwise sense through portion 202, and in a counter-clockwise sense through portion 204.

In FIG. 4B, the axes of transmitting coil 402 and receiving coil apparatus 404 are aligned. More particularly, the axes have no offset (or almost no offset). A current 430 flows in transmitting coil 402 This current causes a magnetic flux vector 434 (coming out of the page), and a magnetic flux vector 436 (entering the page). These vectors induce component currents in receiving coil apparatus 404 that have the same rotational sense.

Thus, in the alignment of FIG. 4B, receiving coil apparatus 404 has a circular configuration. As a result, FIG. 4B shows a net current 432 flowing in a clockwise sense through both of portions 202 and 204.

In FIG. 4C, the axes of transmitting coil 402 and receiving coil apparatus 404 are misaligned to a large extent. More particularly, the axes are misaligned to the extent that, when transmitting coil 402 is projected onto receiving coil apparatus 404, they do not overlap at all.

A current 440 flows in transmitting coil This current causes a magnetic flux vector 444 (coming out of the page), and a magnetic flux vector 446 (entering the page). These vectors induce component currents in receiving coil apparatus 404 that have the same rotational sense. Thus, in FIG. 4C, receiving coil apparatus 404 has a circular configuration. As a result, a net current 442 flows in a counter-clockwise sense through both of portions 402 and 404.

Figure 5B:
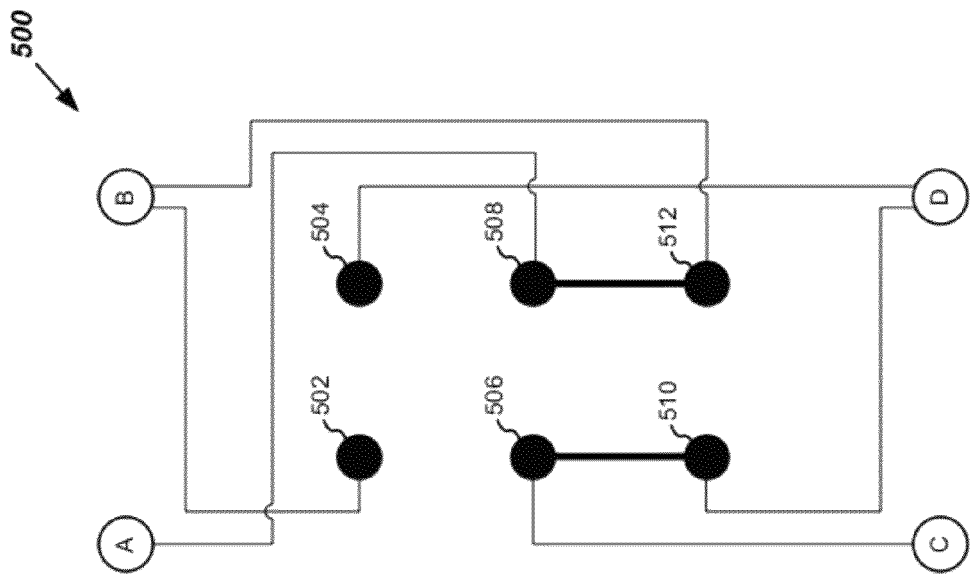
FIGS. 5A and 5B are diagrams of an exemplary switch module implementation.
Figure 5A:
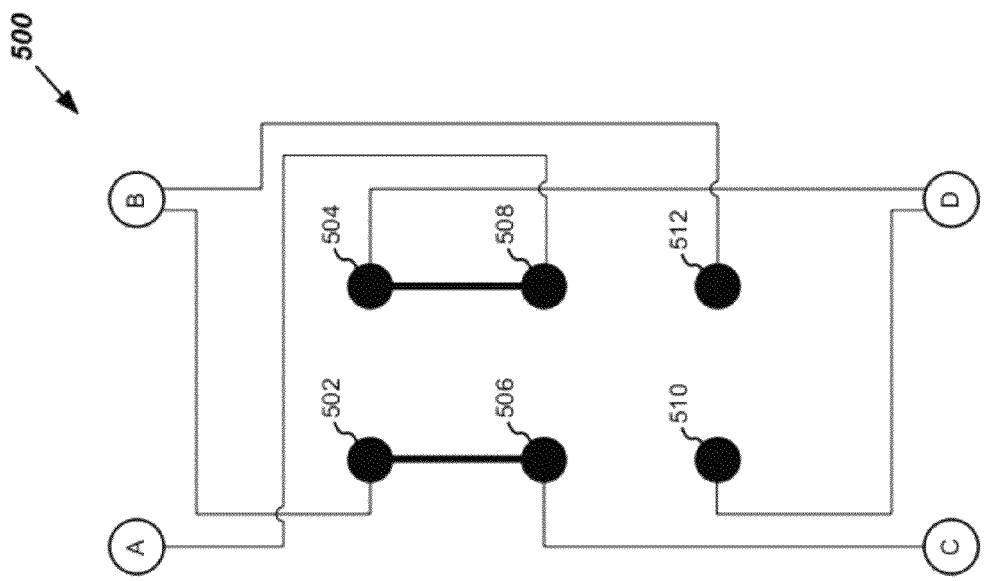

As described above, the configuration of a coil apparatus may be established through a switch module. FIGS. 5A and 5B show an exemplary implementation 500 that may be used in switch module 206. This implementation employs a double pole, double throw arrangement having two settings. These settings of implementation 500 may be based on control directive(s) or signal(s) received from a controlling entity, such as control module 208 of FIGS. 2A and 2B.

As shown in FIGS. 5A and 5B, implementation 500 includes nodes 502-512, which are each coupled to one of terminals A-D (terminals A-D are described above, for example, with reference to FIGS. 2A, 2B, 3A, and 3B). In particular, node 502 is coupled to terminal B, node 504 is coupled to terminal D, node 506 is coupled to terminal C, node 508 is coupled to terminal A, node 510 is coupled to terminal D, and node 512 is coupled to terminal B.

FIG. 5A shows implementation 500 having a first setting. In this setting, a coupling exists between nodes 502 and 506. Also, a coupling exists between nodes 504 and 508. Thus, with reference to FIGS. 2A-4C, this setting may provide for a figure eight configuration.

FIG. 5B shows implementation 500 having a second setting. In this setting, a coupling exists between nodes 506 and 510. Also, a coupling exists between nodes 508 and 512. Thus, with reference to FIGS. 2A-4C, this setting may provide for a circular configuration.

Implementation 500 may be implemented in various ways. In embodiments, electronic (e.g., solid state) switching circuits may be employed. Alternatively or additionally, electromechanical and/or mechanical switches may be employed. Embodiments, however, are not limited to these examples.

Figure 6:
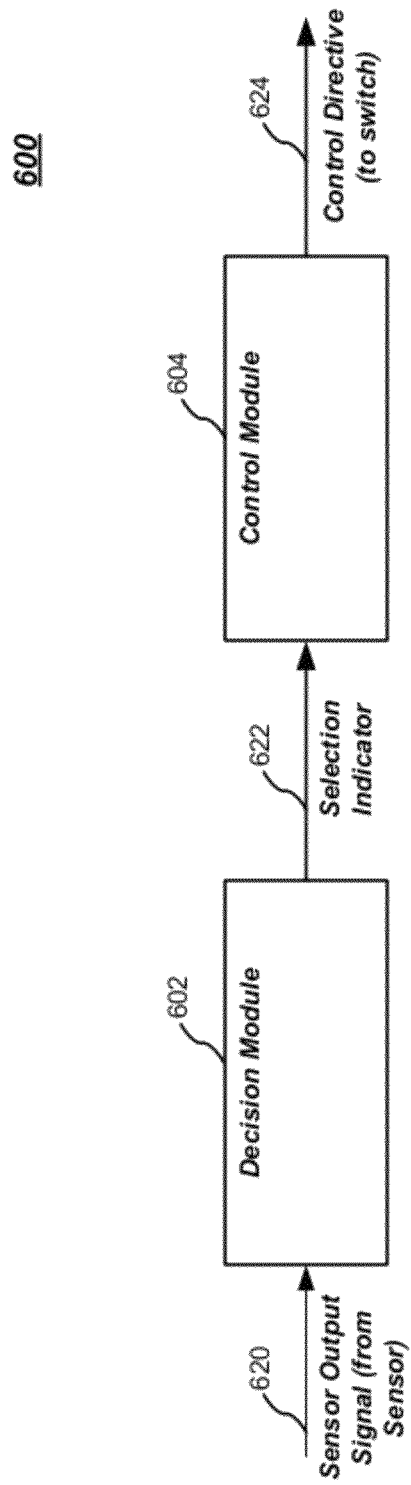
FIG. 6 is a diagram of an exemplary control module implementation.

As described above, a switch module's setting (and consequently a coil configuration) may be determined by a control module. FIG. 6 is a diagram showing an exemplary control module implementation 600. This implementation includes a decision module 602, and a signal generator 604. These elements may be implemented in any combination of hardware and/or software.

FIG. 6 shows that decision module 602 receives one or more sensor output signals 620 (e.g., signal 220 of FIGS. 2A and 2B). Based on these signal(s), decision module 602 selects a coil configuration. For example, decision module 602 may select a circular configuration or a figure eight configuration. This configuration may be selected for coil apparatus 200. However, embodiments are not limited to this context. In turn, decision module 602 produces a selection indicator 622, which is sent to signal generator 604.

Decision module 602 may employ various techniques in selecting a configuration. One such technique involves comparing sensor output signal 620 with one or more thresholds. For example, when sensor output signal 620 indicates alignment between coils, decision module 602 may select a circular configuration when sensor output signal 620 indicates a misalignment less than a first threshold. However, when sensor output signal 620 indicates a misalignment greater than the first threshold and less than a second threshold, a figure eight configuration may be selected. Further, when sensor output signal 620 indicates a misalignment greater than the second threshold, the circular configuration may be selected.

In embodiments where sensor output signal 520 indicates energy transfer characteristics between coils (e.g., one or more of forward power, reflected power, received power, a comparison of forward and reflected power etc.), a threshold based configuration selection scheme may also be employed.

Alternatively, decision module 602 may toggle between configuration selections to determine which configuration yields the best energy transfer characteristics (e.g., as indicated by sensor output signal 620). Such toggling may occur on a repeated basis.

Based on selection indicator 622, signal generator 604 may generate a directive 624 that establishes a setting for a switch module (e.g., for switch module 206). For example, directive 624 may establish a dual pole, dual throw switch setting. Embodiments, however, are not limited to this example. In embodiments, directive 624 may be in the form of one or more control signals (e.g., electrical signals).

Figure 7:
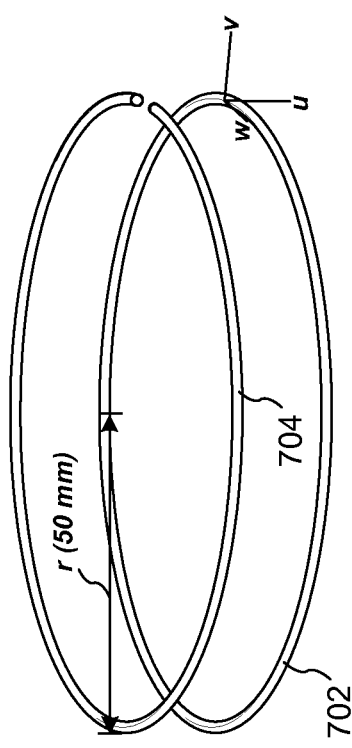
FIGS. 7 and 8 are views of exemplary coil arrangements.
Figure 8:
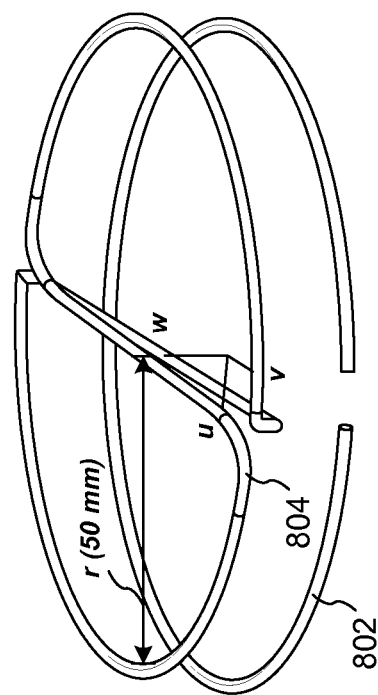

FIGS. 7 and 8 are views of exemplary coil arrangements. In particular, FIG. 7 is a view of an arrangement including coils 702 and 704, each having a circular shape. Each of coils 702 and 704 has a radius r of 50 millimeters. Implementations, however, are not limited to this size.

FIG. 8 is a view of an arrangement having coils of different shapes. In particular, FIG. 8 shows a coil 802 having a circular shape, and a coil 804 having a figure eight shape. Each of coils 802 and 804 has a radius r of 50 millimeters. Implementations, however, are not limited to this size.

Figure 9:
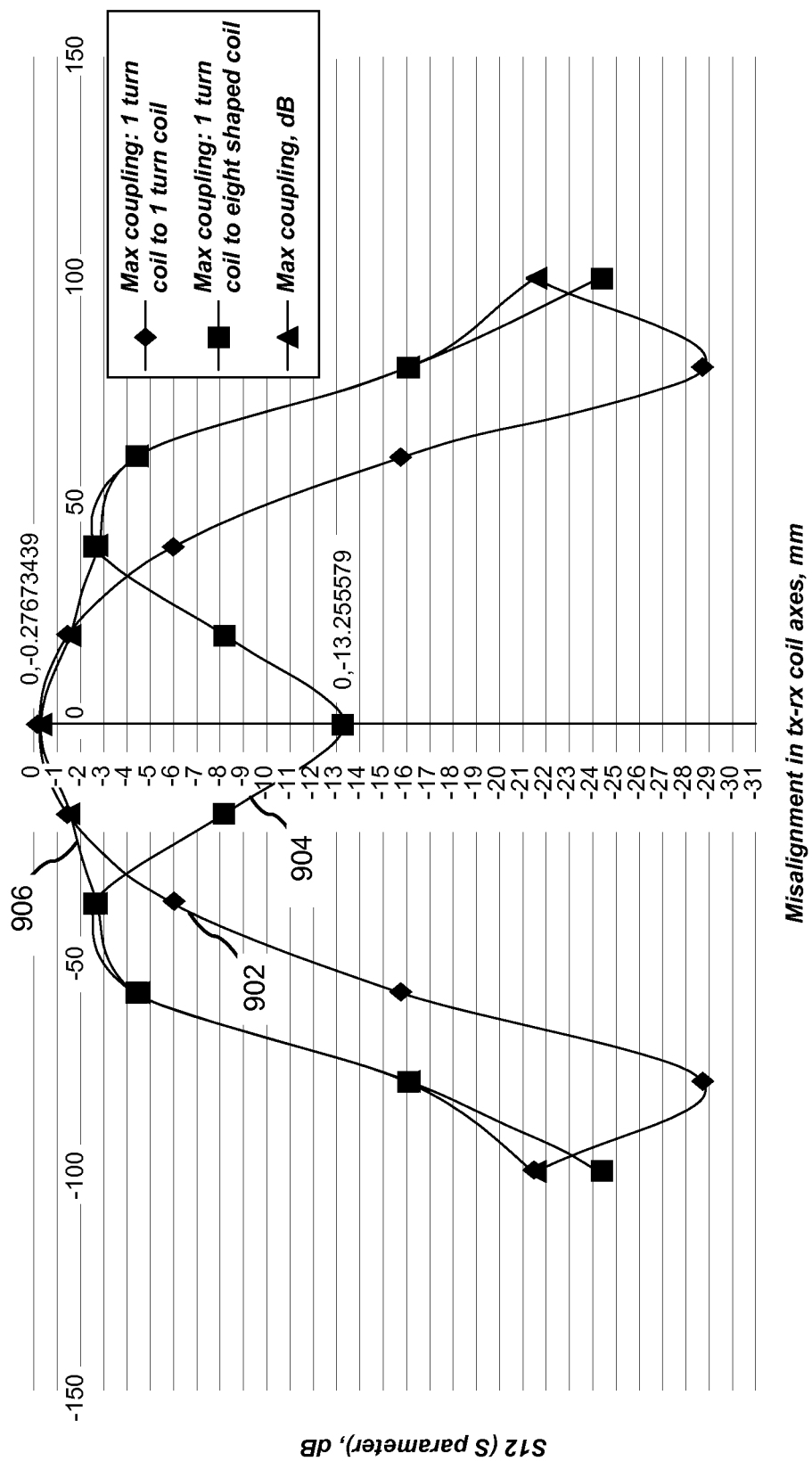
FIG. 9 is a graph showing exemplary performance characteristics.

FIG. 9 is a graph showing exemplary performance characteristics based on simulations of the arrangements of FIGS. 7 and 8. In particular, FIG. 9 shows relationships between alignment (shown in millimeters along the x-axis) and coupling (shown in decibels along the y-axis). On the x-axis, an alignment of zero millimeters indicates that a transmitting coil's axis and a receiving coil's axis are not offset (i.e., they are co-linear). On the y-axis, the coupling is represented by an S parameter.

A curve 902 shows simulated coupling characteristics (S 12) for the arrangement of FIG. 7 (two circular coils). This curve decrease as misalignment increases. A curve 904 shows simulated coupling characteristics (S21) for the arrangement of FIG. 8 (a circular coil and a figure eight coil). This curve reaches a minimum when there is alignment of the coil axes, and increases with misalignment to reach a maximum before decreasing for very large misalignments.

A curve 906 is a combination of curves 902 and 904. In particular, curve 906 indicates coupling when dynamic switching occurs between the arrangement of FIG. 7 and the arrangement of FIG. 8, always utilizing the maximum. Even with 50 millimeter misalignment between the axes of the coils, the simulated S21 of curve 906 is −2.5 dB compared to −6 dB for the circular coil alone (curve 902). The square of the magnitude of S21 corresponds to efficiency in dB.

Figure 10:
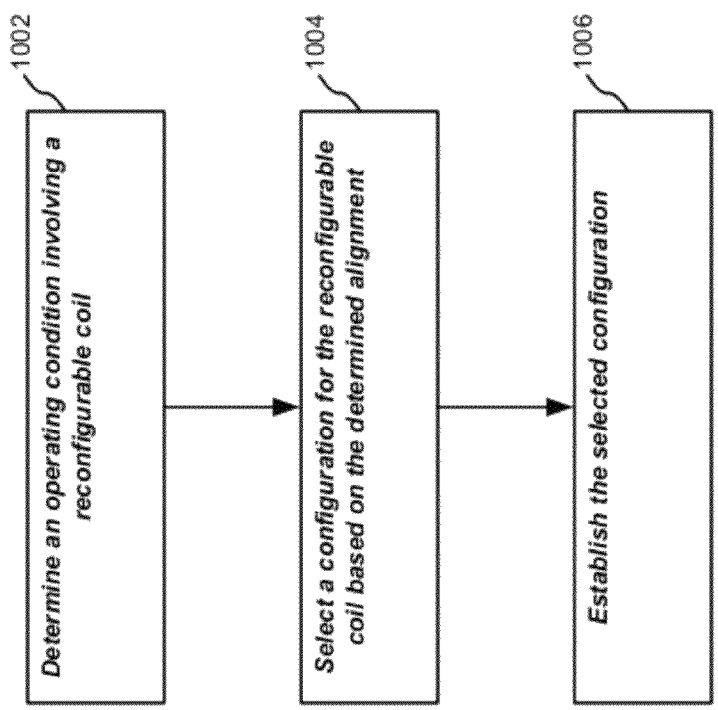
FIG. 10 is a logic flow diagram.

FIG. 10 illustrates an embodiment of a logic flow. In particular, FIG. 10 illustrates a logic flow 1000, which may be representative of the operations executed by one or more embodiments described herein. Although FIG. 10 shows a particular sequence, other sequences may be employed. Also, the depicted operations may be performed in various parallel and/or sequential combinations.

The operations of FIG. 10 are described in the context of a reconfigurable coil having two conductive portions, such as portions 202 and 204 of FIGS. 2A and 2B. Embodiments, however, are not limited to this context. This coil may operate as a receiving coil. Alternatively, this coil may operate used as a transmitting coil.

At a block 1002, an operating condition involving the coil is determined. This operating condition may be an alignment of the reconfigurable coil apparatus with another coil. Alternatively, this operating condition may be one or more energy transfer characteristics (e.g., one or more of forward power, reflected power, received power, a comparison of forward and reflected power etc.). As described herein, this determination may be based on one or more received sensor output signals.

Based on the determined alignment, configuration is selected for the coil apparatus at a block 1004. This selection may from two or more configurations. For example, this selection may be from a figure eight configuration and a circular configuration.

At a block 1006, the selected configuration is established for the reconfigurable coil. In embodiments, this may involve establishing a setting of a switch that is coupled between the first conductive portion and the second conductive portion.

Figure 11:
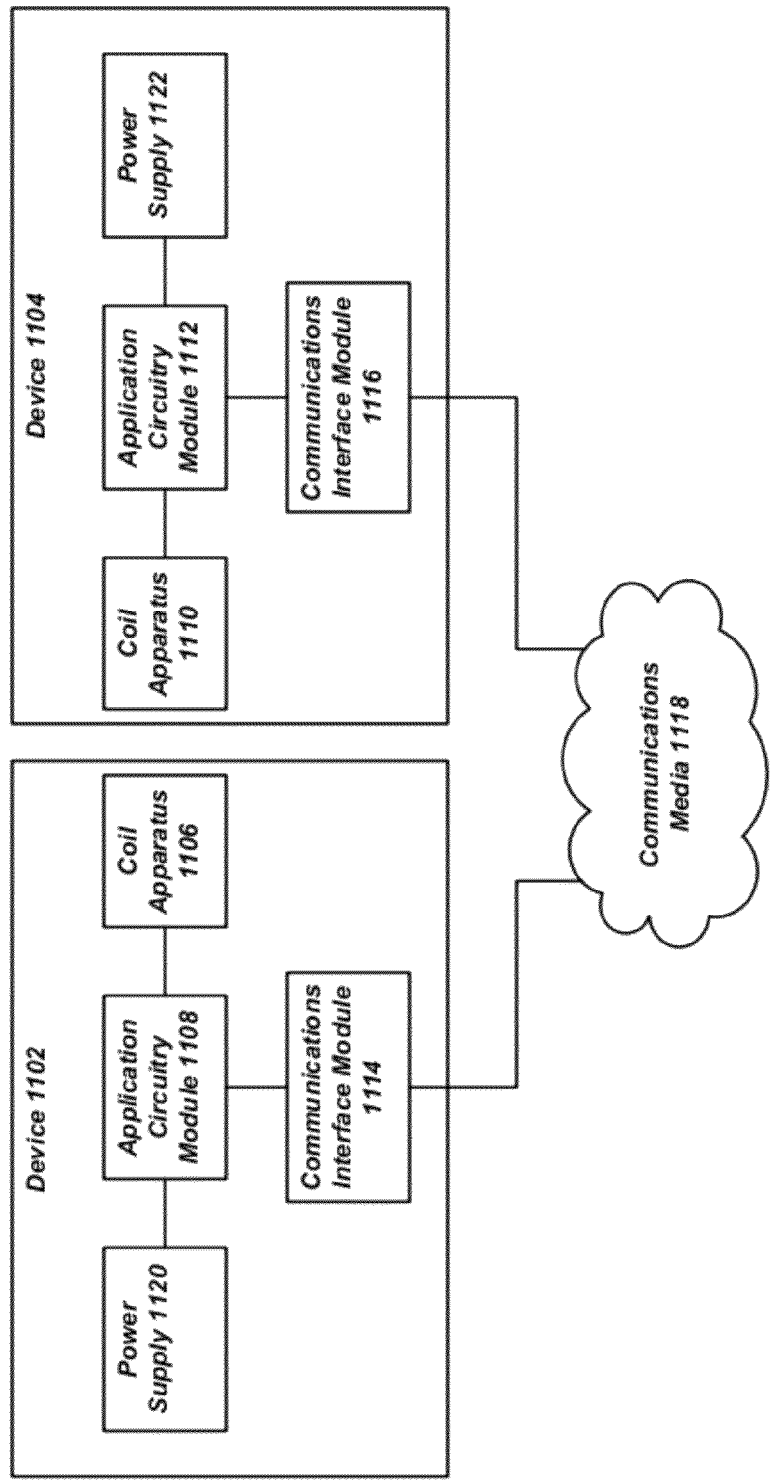
FIG. 11 is a block diagram of an exemplary operational environment.

FIG. 11 is a diagram of an exemplary operational environment 1100 in which the techniques described herein may be employed. This environment includes a first device 1102 and a second device 1104. As shown in FIG. 11, each of devices 1102 and 1104 includes a coil apparatus and an application circuit module. More particularly, device 1102 includes a coil apparatus 1106 and an application circuit module 1108, while device 1102 includes a coil apparatus 1110 and an application circuit module 1112. Through these elements, devices 1102 and 1104 exchange wireless energy in accordance with one or more applications (e.g., wireless charging and/or NFC applications).

In embodiments, one of coil apparatuses 1106 and 1110 operates as a transmitting coil while the other operates as a receiving coil. Also, the transmitting coil and/or the receiving coil may be reconfigurable, as described herein.

As shown in, FIG. 11, devices 1102 and 1104 include communications interface modules 1114 and 1116, respectively. These modules allow for the devices to exchange information across communications media 1118. Such information may include measurements regarding energy transfer (e.g., one or more of forward power, reflected power, received power, a comparison of forward and reflected power, etc.), as described herein. For instance, such information may be transferred from a device having a non-reconfigurable coil to a device having a reconfigurable coil.

Upon receipt of the information at the device having the reconfigurable coil, a sensor module (e.g., sensor module 218 of FIG. 2B) may provide corresponding information to a control module (e.g., control module 208) within the same device. Based on this information the coil may be configured. Thus, a device may configure its coil based on information it receives from the remote coil's device. Embodiments, however, are not limited to this. For example, a device may alignment-based and/or energy transferred based coil configuration techniques that do not involve such communications.

Communications media 1118 may include any combination or wired and/or wireless media that may convey information. Examples of such media include (but are not limited to) wireless communications networks, wired communications networks, optical networks/interfaces, computer bus systems, computer interfaces (e.g., serial and/or parallel interfaces), and so forth. Accordingly, communications interface modules 1114 and 1116 may include various components, such as any combination of transceivers, modulators, demodulators, antennas, baseband processing elements, media access control elements, etc.

Also, FIG. 11 shows that devices 1102 and 1104 may include power supplies 1120 and 1122, respectively. Such power supplies may include a battery. For example, in wireless charging applications, such a battery may be charged.

Also, although not shown, devices 1102 and 1104 may each include processor(s) and storage media (e.g., memory, magnetic, storage, optical storage, etc.). Such elements may be employed to provide various user applications. For instance, the storage media may store instructions (e.g., control logic or software) that causes the processors to execute such applications. Further, the storage media may store data that is handled by such applications.

Such user applications may involve information exchanged through coil apparatuses 1106 and 1110 (e.g., through NFC applications). Accordingly, the processors may each be operatively coupled to a corresponding one of modules 1108 and 1112.

Further, such user applications may involve the exchange of information with users. Accordingly, devices 102 and 1104 may include various user input and output devices. Examples of such devices include (but are not limited to) keypads, keyboards, touch screens, microphones, speakers, displays, etc.

Devices 1102 and 1104 may be of various types. For example, devices 1102 and 1104 may be any combination of be a notebook computer, desktop computer, tablet computer, personal digital assistant (PDA), mobile phone, smartphone, media player, and so forth. In exemplary wireless charging scenarios. The larger device may transmit energy to the smaller, device (e.g., a notebook may wirelessly charge a mobile phone or smartphone). Such a scenario is provided for purposes of illustration and not limitation. Thus, a smaller device may wirelessly charge a larger device.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software.

The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

While various embodiments of the present invention have been described above, it should be understood that they have been presented by way of example only, and not in limitation.

For instance, embodiments are not limited to circular coils. In fact, any suitable coil shape may be employed. Further, while embodiments may employ transmitting and receiving coils having the same or similar sizes, differently sized transmitting and receiving coils may be employed. Also, examples have been described involving single turn coils. However, embodiments may include coils having multiple turns. Also, in embodiments, coils may include air cores or cores of various materials (e.g., ferromagnetic materials).

Moreover, in embodiments, reconfigurable coils may have any number of conductive portions. Further, in such coils, current path properties (e.g., rotational sense) may be changed in any number of portions and in any combination.

Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

The invention claimed is:

1. An apparatus, comprising:
a coil, including: a first electrically conductive portion, a second electrically conductive portion, and a switch coupled between the first and second conductive portions, the switch having a first setting and a second setting;
wherein the first setting provides a first current path, the first current path having a first rotational sense in the first conductive portion and a second rotational sense in the second conductive portion; and
wherein the second setting provides a second current path, the second current path having a same rotational sense in the first and second conductive portions.

2. The apparatus of claim 1, further comprising:
a sensor to generate a sensor output signal; and
a control module to establish a switch setting for the switch based at least on the sensor output signal.

3. The apparatus of claim 2, wherein the sensor is a Hall Effect sensor.

4. The apparatus of claim 2, wherein the sensor is a proximity sensor.

5. The apparatus of claim 2, wherein the sensor is to indicate one or more energy transfer characteristics with a proximate coil.

6. The apparatus of claim 2, wherein the sensor output signal is to indicate a misalignment with a proximate coil.

7. The apparatus of claim 6, wherein the control module is to establish the switch setting as the second setting when the sensor output signal indicates that the misalignment less than a first threshold.

8. The apparatus of claim 7, wherein the control module is to establish the switch setting as the first setting when the sensor output signal indicates that the misalignment is greater than the first threshold and less than a second threshold.

9. The apparatus of claim 8, wherein the control module is to establish the switch setting as the second setting when the sensor output signal indicates that the misalignment is greater than the second threshold.

10. The apparatus of claim 1, wherein the first and second portions are to be inductively coupled to a proximate coil.

11. The apparatus of claim 1, further comprising a control module establish a switch setting for the switch based at least on information received from a remote device, the remote device including a coil.

12. A method, comprising:
determining an operating condition involving a coil, the coil having a first electrically conductive portion and a second electrically conductive portion;
based on the determined operating condition, selecting a configuration for the coil, the selected configuration from two or more configurations;
wherein each of the two or more configurations has a corresponding current path.

13. The method of claim 12,
wherein the two or more configurations include a first configuration and a second configuration;
wherein the first configuration provides a current path having a first rotational sense in the first conductive portion and a second rotational sense in the second conductive portion; and
wherein the second configuration provides a current path having a same rotational sense in the first and second conductive portions.

14. The method of claim 12, wherein the coil is a receiving coil.

15. The method of claim 12, wherein the coil is a transmitting coil.

16. The method of claim 12, wherein determining the operating condition comprises determining an alignment of a coil with a further coil.

17. The method of claim 16:
wherein determining the operating condition comprises sensing a magnetic field from a further coil;
wherein said determining the alignment is based on the sensed magnetic field.

18. The method of claim 16, further comprising sensing a proximity of the coil to the further coil;
wherein said determining the alignment is based on the sensed proximity.

19. The method of claim 12, wherein said determining the operating condition comprises receiving information from a remote device, the remote device including a coil.

20. The method of claim 12, further comprising establishing the selected configuration; said establishing comprising establishing a setting of a switch, the switch coupled between the first conductive portion and the second conductive portion.

* * * * *